R. C. HARTIN.
REINFORCED PIVOTALLY MOUNTED VEHICLE SPRING.
APPLICATION FILED FEB. 19, 1915.
1,163,917.
Patented Dec. 14, 1915.
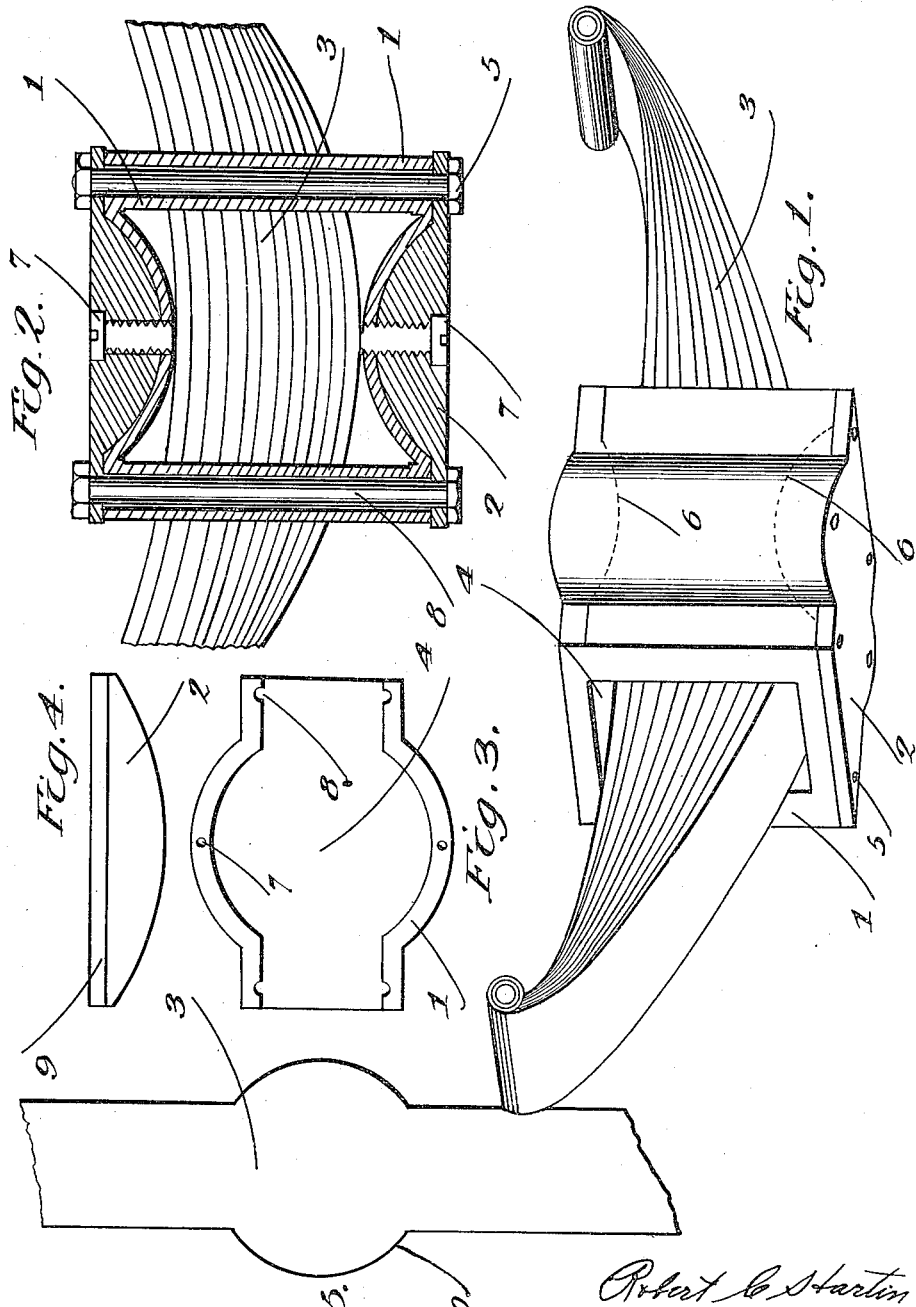

UNITED STATES PATENT OFFICE.

ROBERT C. HARTIN, OF SAN DIEGO, CALIFORNIA, ASSIGNOR OF ONE-HALF TO A. V. MULVENON, OF SAN DIEGO, CALIFORNIA.

REINFORCED PIVOTALLY-MOUNTED VEHICLE-SPRING.

1,163,917.  Specification of Letters Patent.  Patented Dec. 14, 1915.

Application filed February 19, 1915. Serial No. 9,383.

*To all whom it may concern:*

Be it known that I, ROBERT C. HARTIN, a citizen of the United States, residing at San Diego, in the county of San Diego and State of California, have invented certain new and useful Improvements in Reinforced Pivotally-Mounted Vehicle-Springs, of which the following is a full and exact description.

This invention has reference to vehicle springs and is designed as an improvement on the ordinary vehicle springs now in use.

An object of the invention is to produce a spring that is simple in construction, compact, and durable.

Another object is to provide a support for a vehicle body relative to the axle, whereby the strain and jar incident to travel of the vehicle, will be more uniformly distributed and equalized upon each end of the spring and thereby avoid fracture of the spring leaves.

In the usual construction the spring is clamped rigidly to the axle of the vehicle, and, should one end or the other of the vehicle body tilt up and down, it forces the full weight of said body upon one end of the spring which may thereby sustain a fracture or other injury.

To overcome these objections and to attain the objects of the invention, I provide a plurality of spring leaves having centrally disposed and laterally projecting lugs, and a housing which is connected to the axle of the vehicle, the housing having correspondingly shaped sides which engage the lugs on the spring leaves and prevent longitudinal displacement, at the same time allowing a tilting motion to the spring relative to the housing whereby the spring adjusts itself to the level of the supported body and the strain is equally distributed on the ends of the spring. The structural arrangement is such that while the spring leaves are held in a loose contact with the housing or support, they effectually maintain their efficiency as a resilient support for the body.

The principle herein related may be embodied into any suitable form and combination of parts, provided that the elements thereof are relatively proportioned and arranged to perform the functions herein set forth, a preferred form of the device being shown in the accompanying drawings.

Figure 1 is a perspective of my invention. Fig. 2 is a fragmental sectional elevation. Fig. 3 is a top plan view of the housing having the cap removed. Fig. 4 is a side elevation of the cap for the housing. Fig. 5 is a fragmental plan view of the spring leaf, showing the centrally arranged projecting side lugs.

The housing 1 has a cap 2, and is designed to be secured to the axle of a vehicle. A spring 3 rests in the bore 4, of the sleeve thus formed by the housing and cap. The cap 2 is secured to the housing by bolts 8 and nuts 5. The top and bottom of the housing are formed with inwardly projecting arches 6, and the semicircular bearing thus formed serves as a pivot support for the spring leaves. Set screws 7 may be employed in case it is desirable to tighten the leaves of the spring, but are generally dispensed with. The housing is provided with bulging sides 9, corresponding in shape to the lugs 10 on the spring leaves. In this manner the housing holds the leaf springs from longitudinal displacement without the use of bolts or lugs inserted in or passing through the spring and thereby weakening it. Lugs 10 may be of a square form, the preferred form being as shown.

From the foregoing it may be seen that the spring leaves may have an independent rocking or tilting motion relative to one another and to the housing, effectual to prevent fracture of the parts and insuring a greater resiliency as a spring, the arrangement allowing the spring to accommodate itself to the level of the supported body, thereby equalizing the strain upon the ends of the spring.

I claim:

1. The combination with a housing having open ends, outwardly curved sides, and inwardly curved top and bottom, of a multi-leaved spring inserted in said housing and in contact with said inwardly curved top and bottom, and lugs on the spring leaves engaging with said outwardly curved sides.

2. The combination with a multi-leaved spring having oppositely disposed side lugs, of a housing having bulging sides incasing the lugs and having an inwardly arched top and bottom holding the spring leaves in a superposed position one above another.

3. The combination with a multi-leaved spring having centrally disposed reinforcing lugs, of a housing for the spring having correspondingly shaped sides engaging with the lugs, and an inwardly arched top and bottom on said housing abutting against the spring.

4. The combination with a spring having a plurality of leaves and lateral projecting lugs on each leaf, of a housing for said spring, said housing having recessed sides to engage said lugs, and an inwardly arched top and bottom to pivotally support the spring.

5. The combination with a housing having outwardly curved sides and an inwardly curved top and bottom, of a plurality of spring leaves disposed in said housing between the top and bottom, and laterally extending lugs on said spring leaves to engage with said outwardly curved sides.

6. The combination with a multi-leaved spring having lateral centrally disposed lugs, of a housing having an inwardly arched top and bottom supporting the spring, and bulging sides engaging with said lugs, said spring having a tilting motion relative to the housing.

7. The combination with a plurality of spring leaves each having centrally disposed and laterally projecting lugs, of a housing having outwardly bulging sides engaging with said lugs and an inwardly arched top and bottom maintaining the spring leaves in relative position.

8. A housing open at each end and with outwardly bulging sides and inwardly arched top and bottom, of a plurality of spring leaves disposed in said housing and resting on the top and bottom, and semicircular lugs on the spring leaves engaging with the sides.

9. In combination, a plurality of leaf springs, superposed one above another, lugs on the leaf springs, and a housing having an inwardly arched top and bottom, respectively engaging the top and bottom leaf spring and outwardly flaring sides engaging the lugs an each leaf spring.

In testimony whereof I have hereunto affixed my signature to the foregoing specification, the 13th day of February, 1915.

ROBERT C. HARTIN.

In the presence of—
A. V. MULVENON,
H. W. PRICE.

Copies of this patent may be obtained for five cents each, by addressing the "Commissioner of Patents, Washington, D. C."